(12) United States Patent
Lee, Jr. et al.

(10) Patent No.: US 11,976,499 B2
(45) Date of Patent: May 7, 2024

(54) ADJUSTABLE COUPLER BOLT LOCK

(71) Applicant: DYNAMIC MANUFACTURING GROUP LLC, Palmetto, FL (US)

(72) Inventors: Ronald Lee, Jr., Ruskin, FL (US); Anthony Sansone, Parrish, FL (US)

(73) Assignee: Dynamic Manufacturing Group LLC, Palmetto, FL (US)

( * ) Notice: Subject to any disclaimer, the term of this patent is extended or adjusted under 35 U.S.C. 154(b) by 817 days.

(21) Appl. No.: 17/247,458

(22) Filed: Dec. 11, 2020

(65) Prior Publication Data

US 2022/0074236 A1 Mar. 10, 2022

Related U.S. Application Data

(63) Continuation-in-part of application No. 16/948,250, filed on Sep. 10, 2020, now Pat. No. 11,802,585.

(51) Int. Cl.
| | | |
|---|---|---|
| *F16B 39/04* | (2006.01) | |
| *B60D 1/48* | (2006.01) | |
| *B60D 1/52* | (2006.01) | |
| *E05B 67/22* | (2006.01) | |
| *E05B 73/00* | (2006.01) | |
| *F16B 5/02* | (2006.01) | |

(52) U.S. Cl.
CPC ............... *E05B 73/00* (2013.01); *B60D 1/48* (2013.01); *B60D 1/52* (2013.01); *E05B 67/22* (2013.01); *F16B 5/02* (2013.01)

(58) Field of Classification Search
CPC ............ E05B 73/00; E05B 67/22; B60D 1/48

USPC ............................. 411/315; 70/167, 171, 232
See application file for complete search history.

(56) References Cited

U.S. PATENT DOCUMENTS

| | | | | |
|---|---|---|---|---|
| 2,896,440 A | * | 7/1959 | Romsteadt, Jr. | .......... B60B 7/16 70/258 |
| 3,060,786 A | * | 12/1962 | Flower | .................. F16B 5/0208 411/432 |
| 4,030,324 A | * | 6/1977 | Rizio | .................. E05B 73/0076 70/230 |
| 4,031,722 A | | 6/1977 | Michelman et al. | |
| 4,254,647 A | | 3/1981 | Finck, Jr. | |
| 4,444,031 A | | 4/1984 | Watson | |
| 4,621,230 A | | 11/1986 | Crouch et al. | |
| 4,751,831 A | | 6/1988 | Morris, Jr. et al. | |
| 4,774,823 A | * | 10/1988 | Callison | .................. B60D 1/60 70/57 |
| 5,078,437 A | | 1/1992 | Borgmeyer et al. | |
| 5,410,893 A | * | 5/1995 | Easterwood | ......... B62D 53/085 70/56 |

(Continued)

FOREIGN PATENT DOCUMENTS

| | | |
|---|---|---|
| RU | 189674 U1 | 5/2019 |
| WO | 2009007916 A2 | 1/2009 |

*Primary Examiner* — Gary W Estremsky
(74) *Attorney, Agent, or Firm* — Mark Young, PA

(57) ABSTRACT

An anti-tampering device secures bolted components, such as a trailer coupler mounted to an adjustable channel. A nut shield provides hexagonal channels in which nuts are contained. A hasp assembly provides a locking tab. Bolts secure the nut shield and the hasp assembly to the components. A hasp shield with a notched annular flange overlays the hasp assembly, receives the tab through a slot in the area surrounded by the notched annular flange, and contains a puck lock in the area. The puck lock engages the locking tab.

20 Claims, 18 Drawing Sheets

(56) References Cited

U.S. PATENT DOCUMENTS

| | | | |
|---|---|---|---|
| 5,421,601 A * | 6/1995 | Hinze | B60D 1/60 |
| | | | 280/507 |
| 5,469,722 A | 11/1995 | Ellefsen | |
| 5,740,685 A * | 4/1998 | Daoud | H01R 13/6397 |
| | | | 292/307 R |
| 5,904,383 A | 5/1999 | van der Wal | |
| 5,988,966 A | 11/1999 | Chen et al. | |
| 6,308,997 B1 | 10/2001 | Haseley et al. | |
| 6,684,548 B1 | 2/2004 | Petrus | |
| 6,820,362 B1 | 11/2004 | Petrus | |
| 6,892,483 B2 * | 5/2005 | Parenti | B60R 13/105 |
| | | | 40/201 |
| 7,051,558 B2 * | 5/2006 | Mathers | E05B 73/0076 |
| | | | 70/237 |
| 7,243,514 B2 * | 7/2007 | Frantz | E05B 13/101 |
| | | | 411/910 |
| 7,273,203 B2 * | 9/2007 | Carnevali | E05B 65/006 |
| | | | 70/171 |
| 9,803,794 B2 | 10/2017 | White | |
| 2007/0227206 A1 * | 10/2007 | Stone | F16B 41/005 |
| | | | 70/232 |
| 2011/0027044 A1 | 2/2011 | Dillenberger | |
| 2015/0321624 A1 | 11/2015 | Parenti | |
| 2016/0176629 A1 | 6/2016 | Dang | |
| 2018/0094458 A1 * | 4/2018 | Dhadda | E05B 77/44 |
| 2019/0360239 A1 | 11/2019 | Engibarov et al. | |

\* cited by examiner

ADJUSTABLE COUPLER BOLT LOCK

FIELD OF THE INVENTION

This invention relates generally to anti-tampering devices that simultaneously envelope bolt heads and nuts, and, more particularly, to a locking apparatus that envelopes, conceals or limits access to a plurality of bolt heads and nuts that secure objects, such as a coupler and channel, together.

BACKGROUND

With reference to FIGS. 1 and 2, an adjustable trailer coupler 10 mounts to a channel 30. Typically, the back side of the web 32 of the channel 30 is welded to the free end of an A-frame or tow-bar at the leading edge of a trailer. The channel 30 includes a pair of parallel, aligned spaced apart flanges 31, 33 extending from opposite edges of the web 32. The channel 30 includes a plurality (typically 2, 3, 4 or 5) evenly-spaced pairs of mounting holes, such as holes 50 and 70. Three pairs of holes between hole pairs 50 and 70 are not visible in FIGS. 1 and 2, because they are concealed by mounting bolts 35-45 and nuts 75-85. Each pair of holes includes a hole in one flange 31 aligned with a hole in the opposite flange 33. The coupler 10 includes a mounting structure 25 sized to fit within the space between the flanges of the channel 30. The structure 25 is sized and shaped to fit snugly, occupying most or all space between opposed flanges for the height of the mounting structure 25. The mounting structure 25 of the coupler includes a plurality (typically 2 or 3) evenly-spaced mounting holes (i.e., cylindrical channels), configured to align with pairs of the mounting holes in the channel 30 when the mounting structure 25 of the coupler 10 is received in the space between the flanges of the channel 30. All holes in the channel 30 are equal (or about equal) size. The diameter of each hole in the mounting structure 25 of the coupler 10 is equal in diameter to each hole of the pair of holes in the channel. The coupler 10 is secured to the channel 30 at a desired elevation (i.e., a desired mounting height) by aligning holes in the mounting structure 25 of the coupler with holes in the flanges of channel 30 and passing the shanks of bolts 35-45 through aligned holes. Nuts 75-85 secure the bolts 35-45 in place. Typically, two or three bolts are used. In the nonlimiting example shown in FIGS. 1 and 2, three bolts are shown extending through three middle pairs of mounting holes in the channel 30 and corresponding mounting holes in the mounting structure 25 of the coupler 10. In one nonlimiting example, the coupler includes a socket 15 and a lock 20 for engaging a compatibly sized towing ball on a hitch of a vehicle. However, the invention is not limited to any particular type of coupler.

Theft is a problem with couplers that mount to a channel. Any thief with a wrench can remove the nuts, remove the bolts and steal the coupler. Such couplers may be an expensive item. In addition to creating a cost, theft inconveniences the trailer owner, because the owner must now procure and install a replacement coupler. Some retailers carry replacements couplers. If such a retailer is not in the vicinity, it may take days to replace a coupler.

A more serious risk is not merely theft of the coupler, but theft of the entire trailer. Locks are available for coupler sockets. Such locks range from simple padlocks on the locking latch of the coupler to more complex locks that cover the socket. A thief may remove the coupler with the locked socket, as described above. After removal, the thief may install a replacement coupler, connect the coupler to a trailer hitch, and steal the trailer.

Any product that relies upon nuts and bolts extending through aligned holes of two or more parts for security, is vulnerable to theft in the same manner. A thief may remove the nuts, remove the bolts and steal one or both parts.

A security system for products that rely upon nuts and bolts extending through aligned holes of two or more parts for security is needed. Such a system should reduce the risk of theft of channel mounted couplers and of trailers that use channel mounted couplers.

The invention is directed to overcoming one or more of the problems and solving one or more of the needs as set forth above.

SUMMARY OF THE INVENTION

To solve one or more of the problems set forth above, in a non-limiting exemplary implementation of the invention, an anti-tampering device includes a shield assembly, a hasp assembly, a nut assembly, and a hidden shackle padlock. The device shields the heads of bolts and engaged nuts to reduce risk of tampering. When used on a channel mount coupler, the device protects the coupler from tampering and unauthorized removal.

An anti-tampering device according to principles of the invention secures bolted components, such as a trailer coupler mounted to an adjustable channel. A nut shield provides bolt holes for mounting and hexagonal channels in which nuts are contained. A hasp assembly provides a locking tab. Bolts along with nuts secure the nut shield and the hasp assembly to the components on opposite sides of the components. A hasp shield with a notched annular flange overlays the hasp assembly, receives the tab through a slot in an area surrounded by the notched annular flange, and contains a puck lock in the area. The puck lock engages the locking tab, locking the hasp shield against the hasp assembly. The heads of all bolts are covered by the hasp shield. The components may be bolted together with two or more bolts. The anti-tampering device may be adapted to work with two or more bolts. An anti-tampering device according to principles of the invention adapted to work with three bolts may work with two bolts, leaving an unoccupied bolt head hole. An anti-tampering device according to principles of the invention adapted to work with two bolts may work with three bolts, leaving the head and nut of one bolt unshielded.

The shield assembly receives the hidden shackle padlock, which engages a hasp and covers the head of a bolt. The shield assembly also covers the head of at least one other bolt. The shield assembly includes a base plate and a notched tubular flange projecting from the base plate. A hasp slot and a bolt hole are formed in the base plate within an area encircled by the notched tubular flange. The notched tubular flange is sized and shaped to receive the hidden shackle padlock, a hasp and a bolt head. The base plate includes at least one tab, preferably two tabs. Each tab covers the head of another bolt.

The hasp assembly includes a central region with a projecting hasp and a bolt hole. The central region is flanked by tabs, each having a head hole. The bolt hole is sized and shaped to receive the shank of a bolt, without allowing the head of the bolt to pass through. Each head hole has a larger diameter than the bolt hole, because each head hole surrounds the head of a bolt. The thickness of the hasp assembly is at least equal to the thickness of the bolt head. Thus, a bolt head may be contained in a head hole.

The nut assembly is a structure with a base that contains a plurality of (e.g., 3) evenly spaced bolt holes that can be aligned with the bolt hole and head holes of the hasp assembly. The nut assembly also includes an outer portion that includes a hexagonal channel aligned with each bolt hole. Each hexagonal channel is sized and shaped to receive a hexagonal nut, but prevent rotation of the nut in the hexagonal channel.

The shield assembly overlays the hasp assembly. The hasp extends through the hasp slot in the base plate of the shield assembly. Each tab of the base plate covers a head hole. The shield assembly and hasp assembly are located on one side of a bolted structure. The nut assembly is located on the opposite side of the bolted structure.

In one exemplary embodiment, a bolted assembly (e.g., an assembly of a trailer coupler and a channel mount) includes an anti-tampering device according to principles of the invention. The bolted assembly includes a first component (e.g., a coupler) and a second component (e.g., a channel mount). The first component includes a plurality of mounting holes. The second component includes a plurality of mounting holes alignable with the plurality of mounting holes of the first component.

A plurality of bolts and a plurality of nuts are provided. Each bolt has a head and a shank with a threaded end.

The anti-tampering device includes a nut shield, hasp assembly and hasp shield. A compatible lock is also provided.

The nut shield includes a body having a plurality of bolt holes and plurality of hexagonal channels. Each bolt hole of the nut shield is aligned with a hexagonal channel of the nut shield. Each hexagonal channel is configured to contain and prevent rotation of a nut. Each bolt hole is configured to receive a threaded end of a bolt and to prevent passage of the nut from the hexagonal channel into the bolt hole.

The hasp assembly includes a hasp body with at least one head hole and a bolt hole. A locking tab extends orthogonally from the hasp body. A head hole and the bolt hole in the hasp body are configured for alignment with the bolt holes and hexagonal channels of the nut shield. Each head hole is sized to contain a head of a bolt.

The hasp shield includes a hasp shield body configured to overlay the hasp body. The hasp shield body includes a slot for receiving the locking tab of the hasp assembly and a head hole in alignment with the bolt hole of the hasp assembly when the locking tab is received through the slot in the hasp shield body. An annular flange extends from the hasp shield body, surrounds the slot and head hole in the hasp shield body and a defines a volume in which the lock may be received.

A shank of a first bolt extends through a first mounting hole in the first component, and through a first mounting hole in the second component, and into the nut shield. A first nut engages the threaded end of the first bolt. The first nut is contained in a first hexagonal channel of the nut shield.

A shank of second bolt extends through the bolt hole of the hasp assembly, a second mounting hole in the first component, a second mounting hole in the second component, and into the nut shield. The second nut engages the threaded end of the second bolt and is contained in a second hexagonal channel of the nut shield.

Optionally the device may accommodate a third bolt. In such an embodiment, the shank of the third bolt may extend through a third mounting hole in the first component, a third mounting hole in the second component, and into the nut shield. A third nut engages the threaded end of the third bolt. The third nut is contained in a third hexagonal channel of the nut shield.

The lock may be a hidden shackle padlock. The annular flange has an inner diameter. The hidden shackle padlock has an outer diameter. The inner diameter of the annular flange is not less than the outer diameter of the hidden shackle padlock. Thus, the hidden shackle padlock fits into the volume defined by the annular flange. Whether the hidden shackle padlock is entirely or mostly contained in the volume is not important. Preferably, the volume defined by the annular flange is sufficient to at least substantially contain the hidden shackle padlock.

The annular flange may include a notch. If the hidden shackle padlock includes a moveable locking element (e.g., a keyed locking cylinder), the notch defines a space configured to receive the moveable locking element when it is unlocked and extended from the body of the hidden shackle padlock.

The hidden shackle padlock includes a rear compartment and a bolt moveable in the rear compartment. The tab of the hasp assembly extends into the rear compartment. A locking bolt moveable between a locked position and an unlocked position, engages the tab in the rear compartment, in the unlocked position. In the unlocked position, the bolt is apart from the tab in the rear compartment. The tab includes an aperture, and in the locked position the bolt extends through the aperture of the tab.

In one embodiment, the nut shield is composed of plates including an inner nut shield plate, a middle nut shield plate and an outer nut shield plate. The inner nut shield plate includes bolt holes and hexagonal holes configured for alignment with the bolt holes when the middle nut shield plate overlays the inner nut shield plate. The outer nut shield plate includes hexagonal holes configured for alignment with the hexagonal holes of the middle nut shield plate when the outer nut shield plate overlays the middle nut shield plate. The hexagonal channels are comprised of the hexagonal holes of the outer nut shield plate aligned with the hexagonal holes of the middle nut shield plate when the outer nut shield plate overlays the middle nut shield plate. The plates are attached together.

In one embodiment, the hasp body includes an inner hasp body plate overlaying an outer hasp body plate. The inner hasp body plate includes the bolt hole. The outer hasp body plate includes a partial cutout bent to form the tab. One or more head holes is formed in the inner hasp body plate and overlaid outer hasp body plate, i.e., the hasp holes extend through the overlaid portions. The outer hasp body plate is attached to the inner hasp body plate.

The head of a first bolt may be contained in a first head hole of the hasp assembly and overlaid by the hasp shield. The head of a second bolt may be overlaid by a hidden shackle padlock in the volume defined by the annular flange. The head of a third bolt may be contained in another head hole of the hasp assembly and overlaid by the hasp shield. The nuts threadedly engaged by each bolt are contained in hexagonal channels of the nut shield. Thus the nuts and bolt heads are shielded from tampering by an anti-tampering device according to principles of the invention.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary anti-tampering device according to principles of the invention includes a shield assembly, a hasp assembly, a nut assembly, and a hidden shackle padlock. The device prevents tampering (e.g., unauthorized removal) of nuts and bolts securing two objects together, such as a channel mounted trailer coupler and a channel mount. The shield assembly conceals heads of bolts contained in the hasp assembly. The nut assembly envelopes nuts. The hidden shackle padlock engages a hasp of the hasp assembly. The hasp extends through a slot in the shield assembly into a notched tubular flange sized and shaped to receive the hidden shackle padlock.

Figure 1:
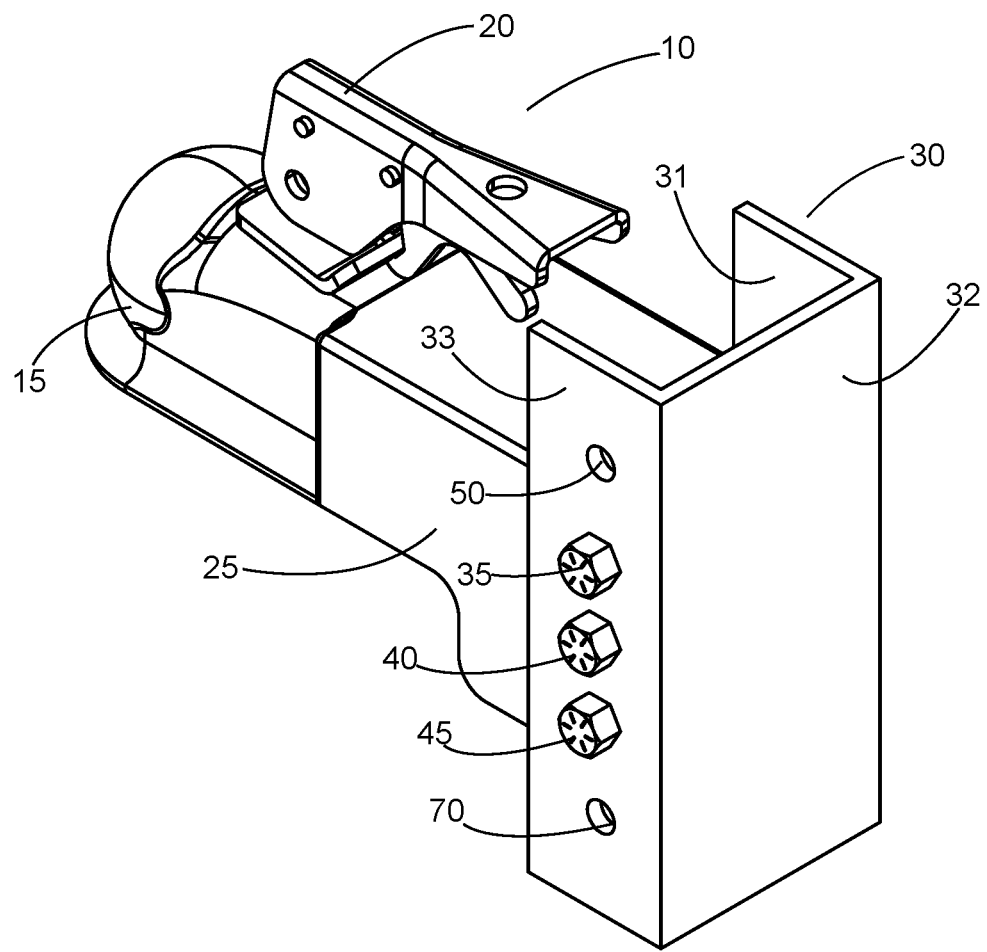
FIG. 1 is a perspective view of an exemplary coupler assembly that can be secured using an anti-tampering device according to principles of the invention.
Figure 2:
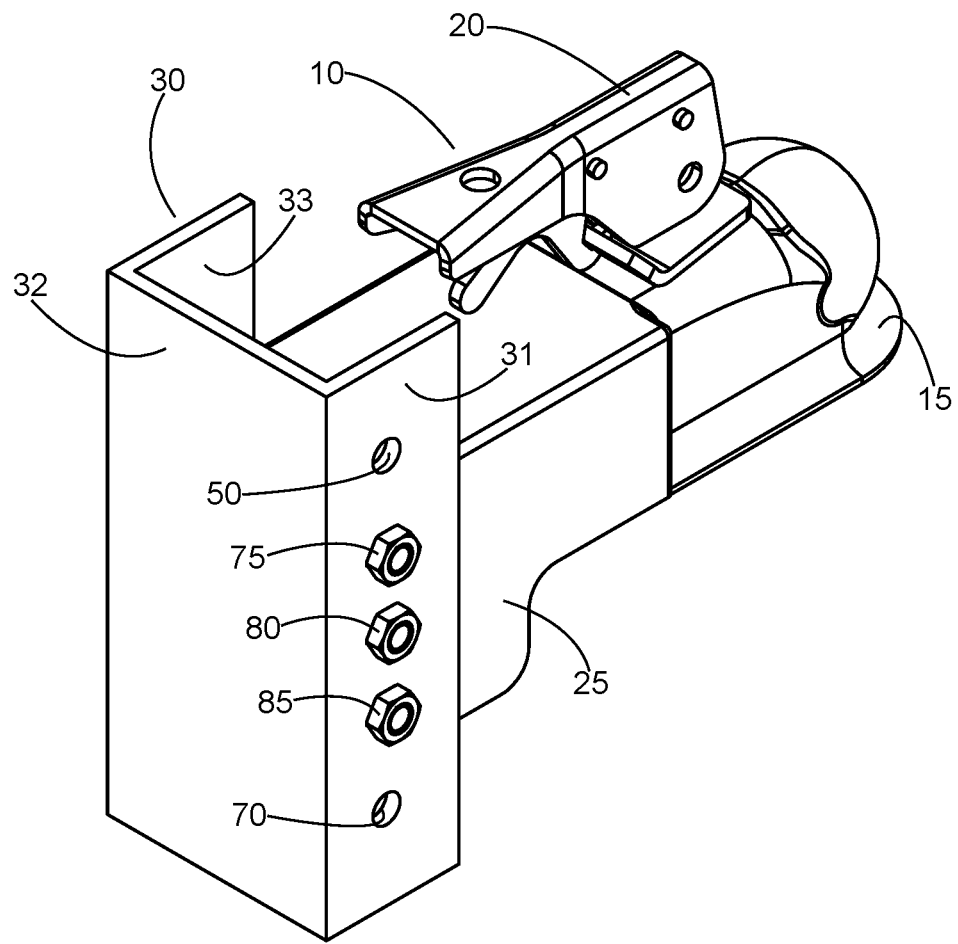
FIG. 2 is another perspective view of the exemplary coupler assembly of FIG. 1.
Figure 3:
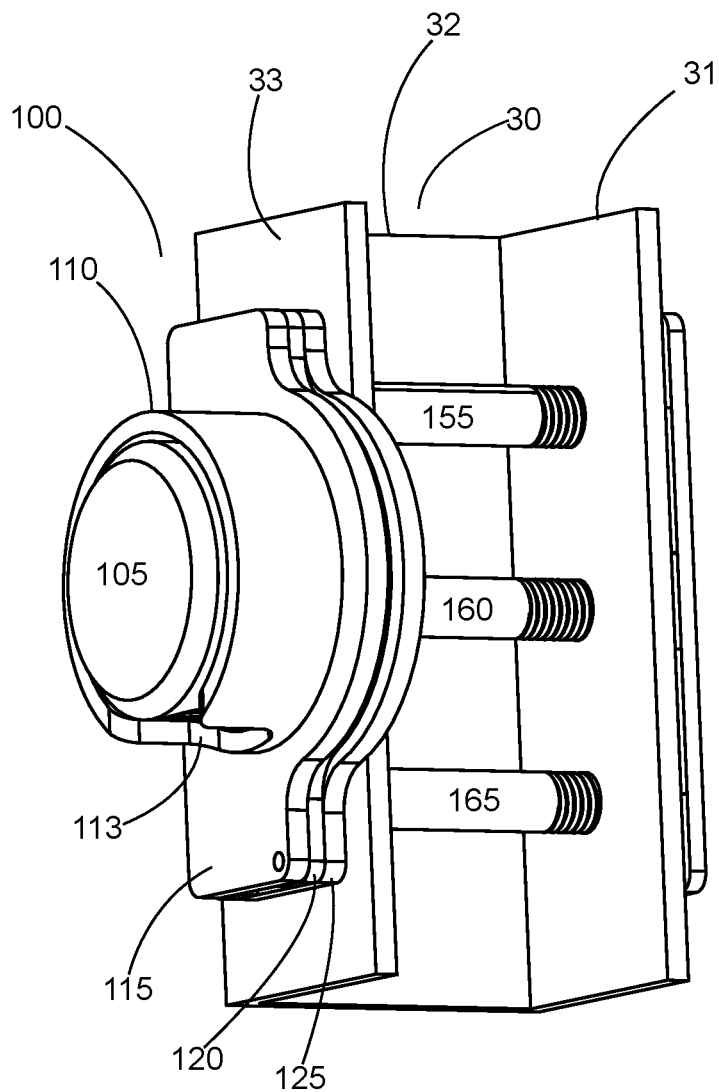
FIG. 3 is a perspective view of an exemplary anti-tampering device on a channel mount according to principles of the invention.
Figure 4:
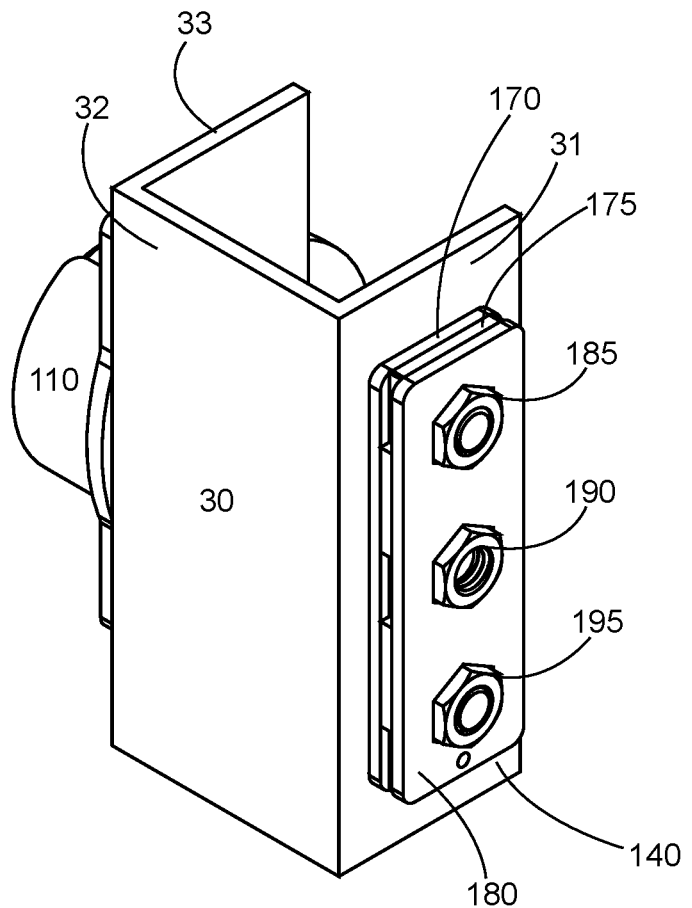
FIG. 4 is another perspective view of an exemplary anti-tampering device on a channel mount according to principles of the invention.
Figure 5:
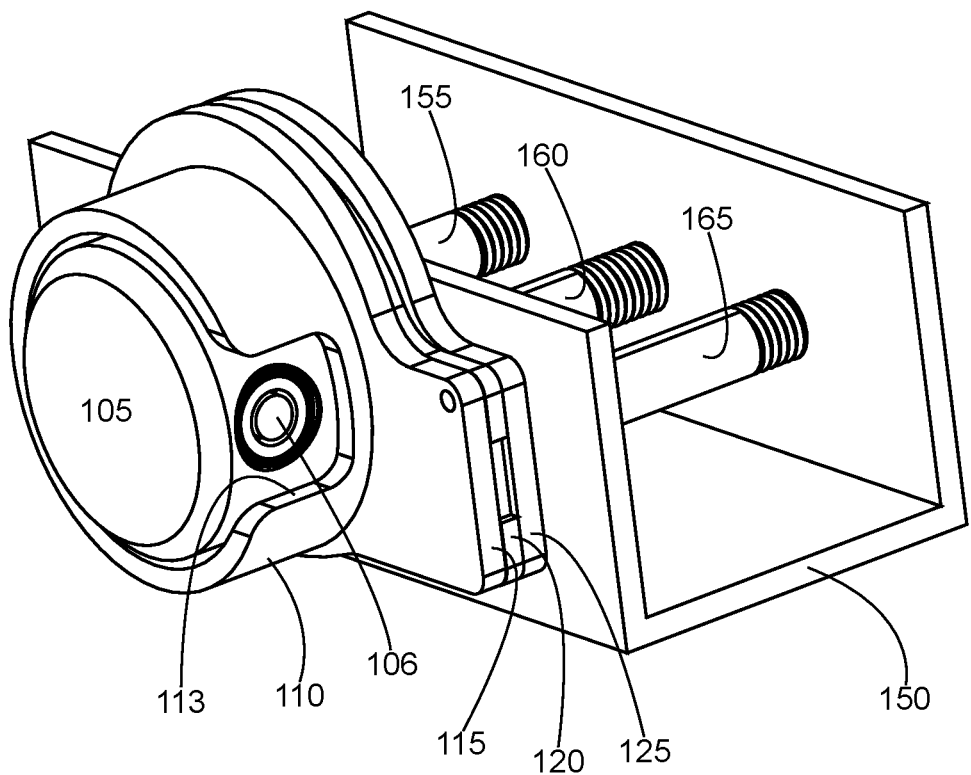
FIG. 5 is another perspective view of an exemplary anti-tampering device on a channel mount according to principles of the invention.
Figure 6:
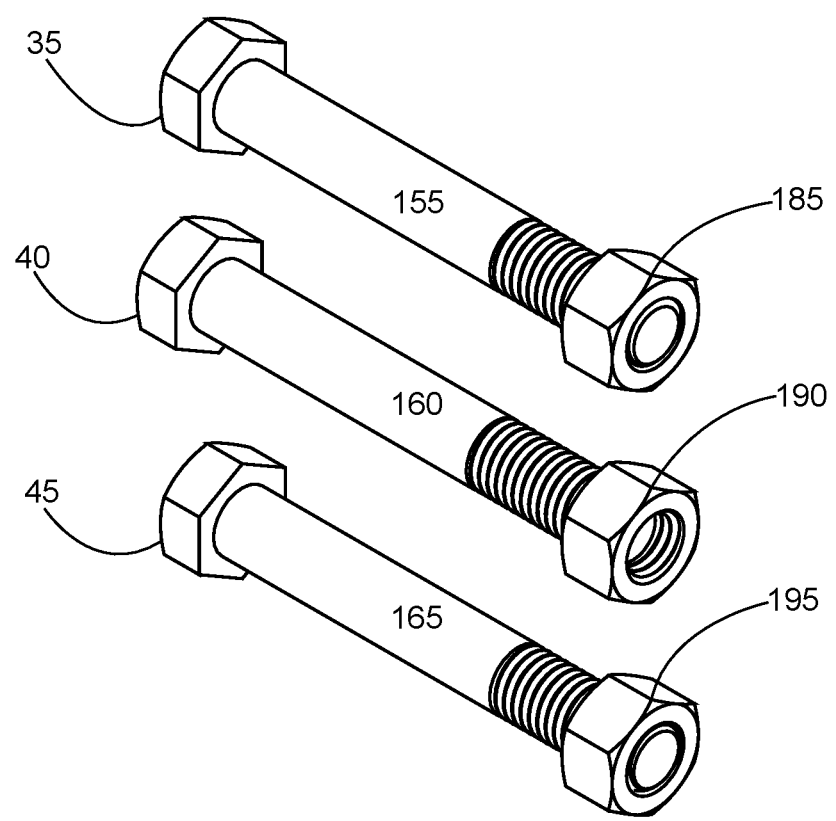
FIG. 6 is a perspective view of exemplary nuts and bolts secured by the exemplary anti-tampering device according to principles of the invention.

Referring to FIGS. 3-5, perspective views of an exemplary anti-tampering device 100 on a channel mount 150 according to principles of the invention are provided. The channel mount 30 is a structural channel, e.g., steel, with a web 32 and a pair of parallel aligned spaced apart flanges 31, 33. The pair of parallel, aligned spaced apart flanges 31, 33 extend from opposite edges of the web 32. The channel 30 includes a plurality of evenly-spaced pairs of mounting holes, through which bolts 155, 160, 165 extend. As shown in FIG. 6, the bolts 155, 160, 165 include heads 35, 40, 45 and shanks with threaded ends engaged by nuts 185, 190, 195.

Base plate 115 and tubular notched flange 110 comprise an exemplary shield assembly 130, as also shown in FIGS. 7,8, 9, 11 and 14. The shield assembly 130 receives the hidden shackle padlock 105, which engages a hasp 123 and covers the head 40 of a bolt 160. The shield assembly 130 also covers the head of at least one other bolt. In the illustrated embodiment, the shield assembly 130 covers the heads 35, 45 of two other bolts 155, 165. The notched tubular flange 110 is attached to and projects orthogonally from the base plate 115. The base plate 115 is generally planar. The base plate 115 and notched tubular flange 110 may be integrally formed (e.g., cast and/or machined) or formed separately and fastened together such as by welding or riveting. A hasp slot 111 and a bolt head hole 114 are formed in the base plate 115, within an area encircled by the notched tubular flange 110. The bolt head hole 114 is sized to receive the head 40 of bolt 160. The hasp slot 111 is positioned, shaped and sized (i.e., configured) to receive a hasp 123 of the hasp assembly 135. The notched tubular flange 110 defines a volume 112 that is sized and shaped to receive the hidden shackle padlock 105, the hasp 123 and a bolt head 40. The hasp slot 111 and hasp 123 are located for the hasp 123 to mate with the hidden shackle padlock 105. The base plate 115 includes at least one tab, preferably two tabs 116, 118. Each tab 116, 118 covers the head 35, 45 of another bolt 155, 165.

Figure 7:
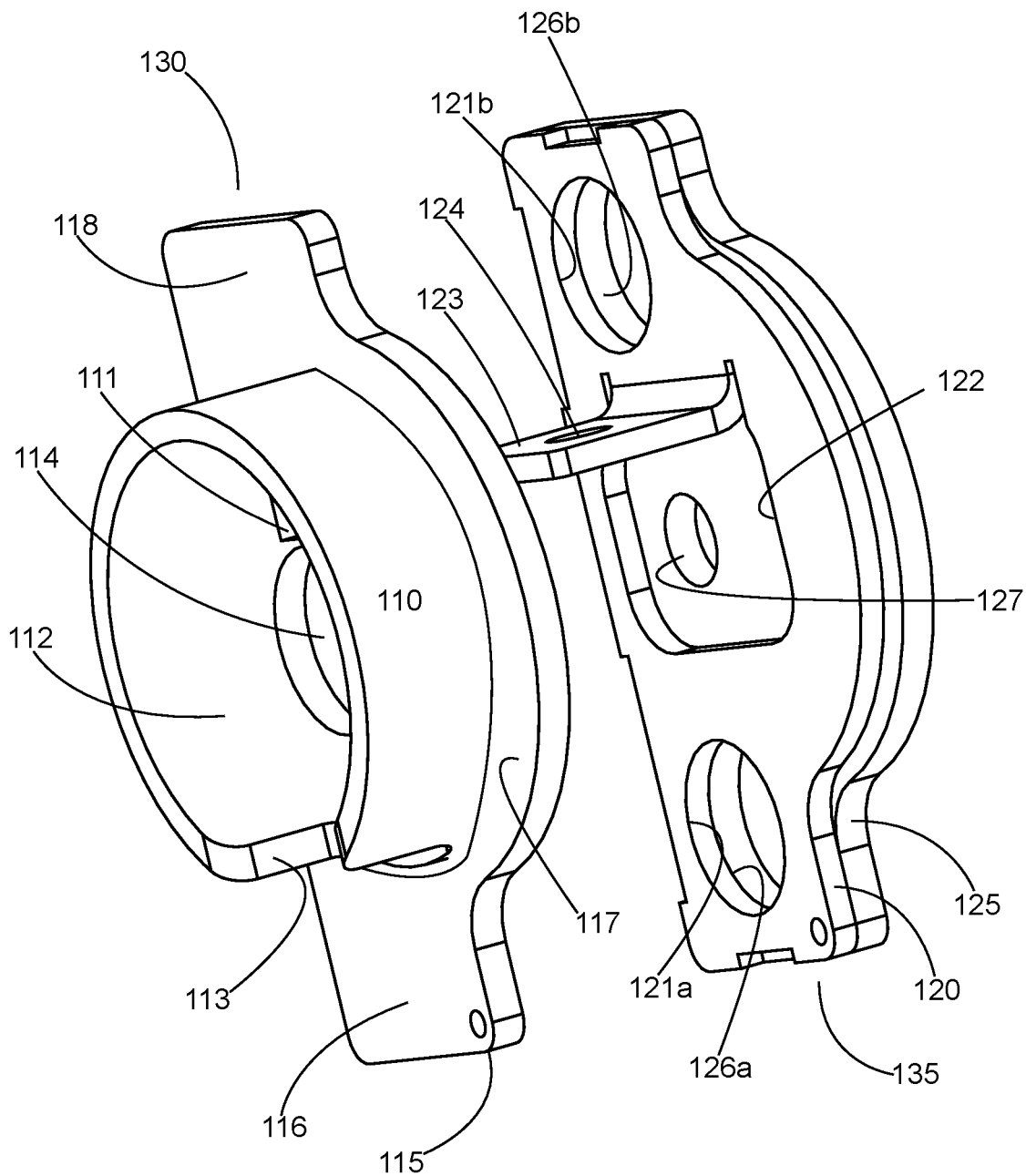
FIG. 7 is a perspective view of an exemplary hasp shield assembly and hasp assembly for an anti-tampering device according to principles of the invention.
Figure 8:
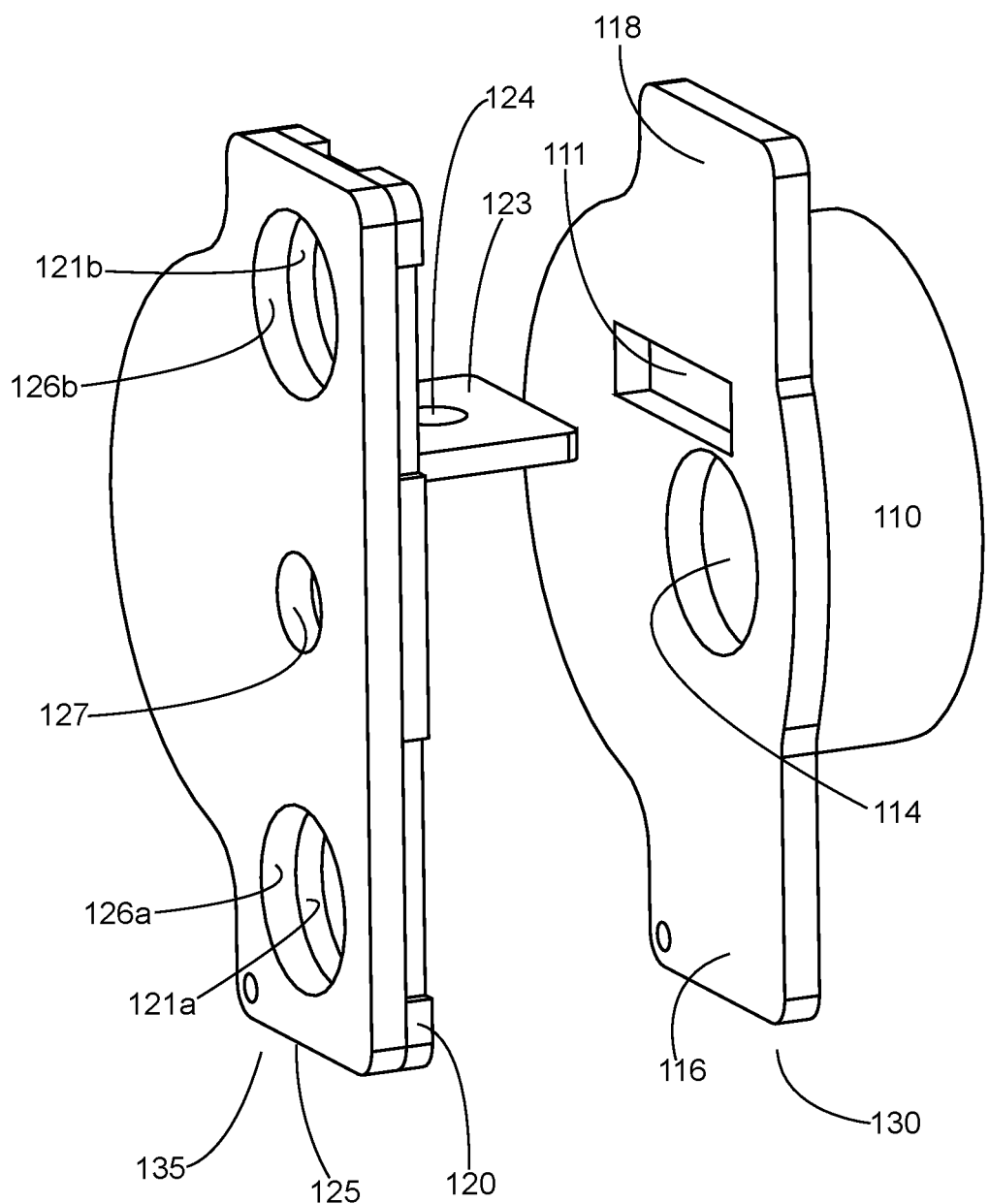
FIG. 8 is another perspective view of an exemplary hasp shield assembly and hasp assembly for an anti-tampering device according to principles of the invention.
Figure 9:
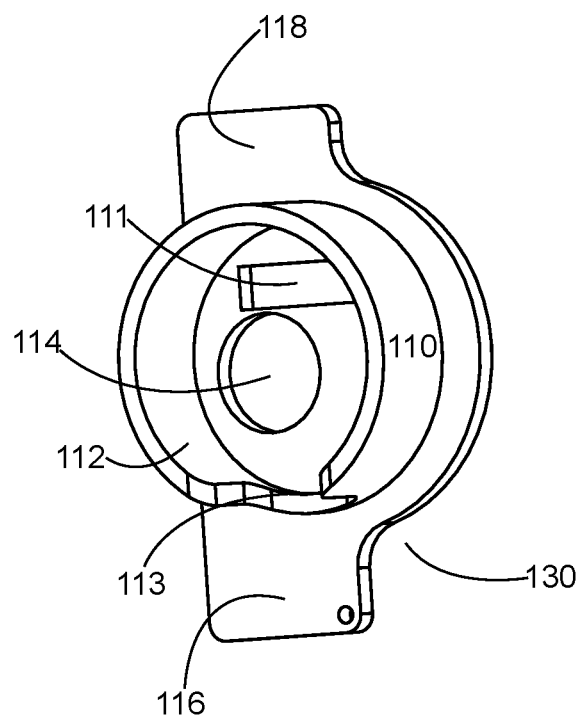
FIG. 9 is another perspective view of an exemplary hasp shield assembly for an anti-tampering device according to principles of the invention.
Figure 10:
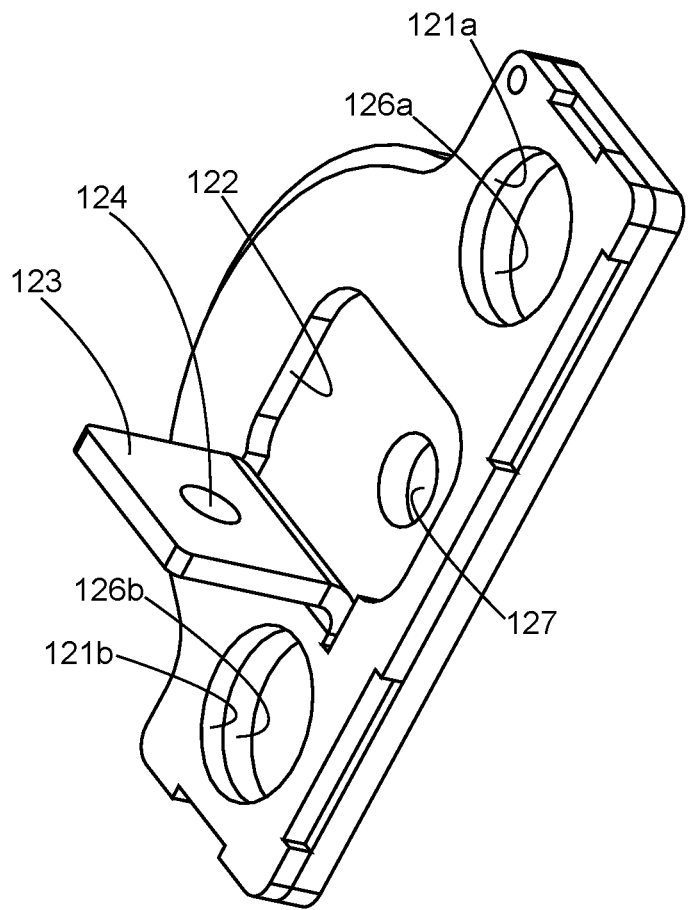
FIG. 10 is another perspective view of an exemplary hasp assembly for an anti-tampering device according to principles of the invention.
Figure 11:
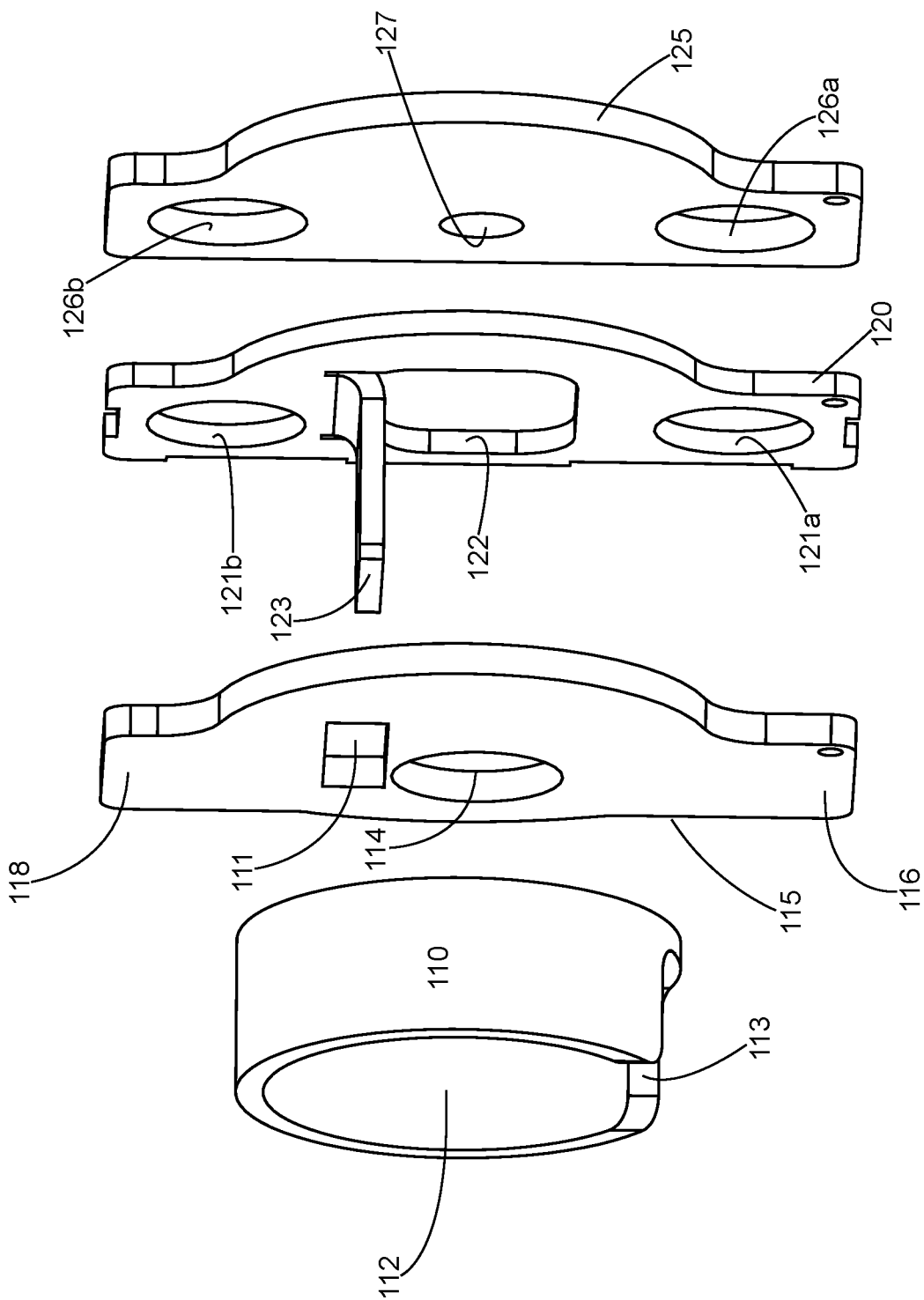
FIG. 11 is an exploded perspective view of an exemplary hasp shield assembly and hasp assembly for an anti-tampering device according to principles of the invention.

The shield assembly 130 and hasp assembly 135 may be separate parts, as illustrated in FIGS. 7 and 8. Alternatively, the shield assembly 130 may be attached to the hasp assembly 135, by welding, mechanical fastening or other attachments. In this alternative embodiment, the the shield assembly 130 and hasp assembly 135 comprise a single part.

Hasp panel 120 and back panel 125 comprise a hasp assembly 135, as shown in FIGS. 7, 8, 10 and 11. The hasp assembly 135 is disposed between the shield assembly 130 and the web 33 of the channel 30 adjacent to the bolt heads 35-45. The has assembly 135 provides a hasp 123 that extends through the hasp slot 111 and is engaged by the hidden shackle padlock 105. The hasp assembly is secured against the web 33 of the channel 30, by a bolt 160 extending through a bolt hole 127, and the head 40 of the bolt 160 abuts the back panel 125.

Figure 14:
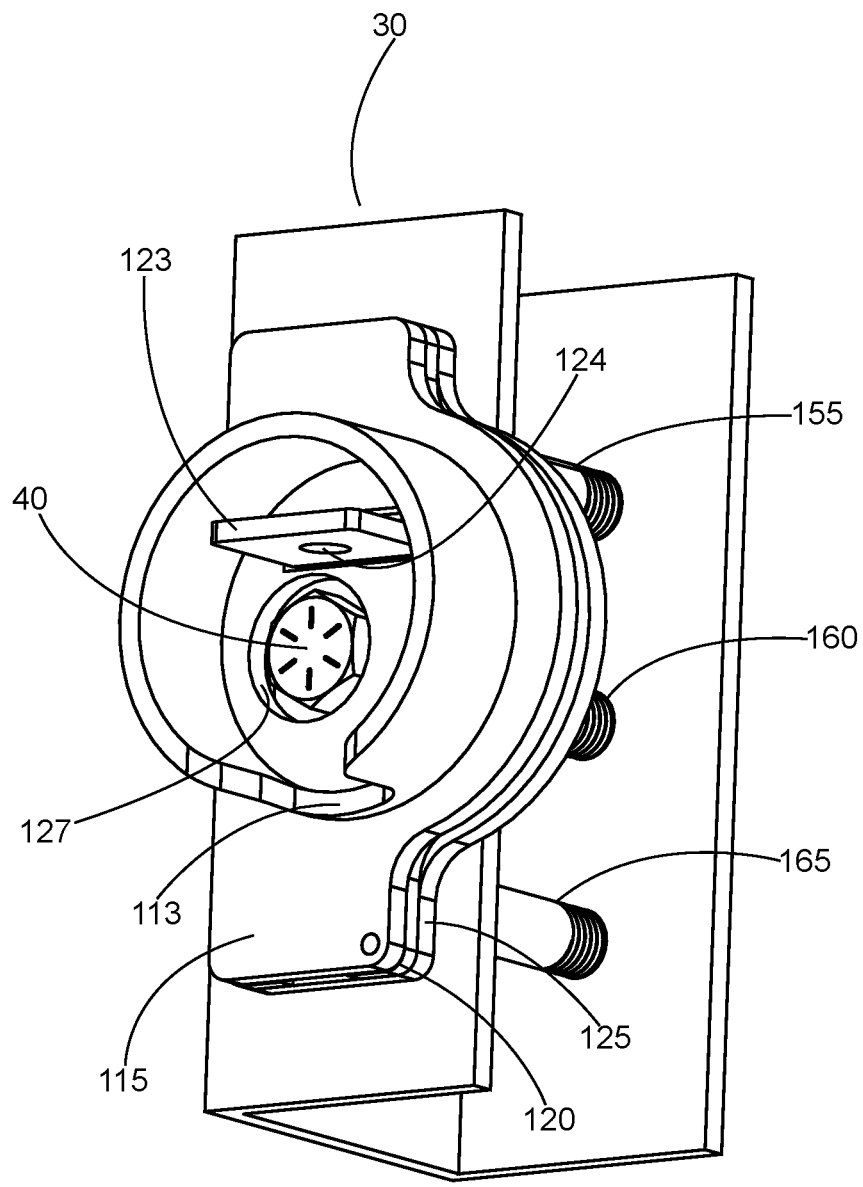
FIG. 14 is a perspective view of an exemplary anti-tampering device according to principles of the invention, without an installed hidden shackle padlock, to reveal the hasp and a shielded bolt head.

The hasp assembly 135 includes a central region with a projecting hasp 123 and a bolt hole 127. The hasp 123 is located, sized and shaped to extend through the hasp slot 111 of the shield assembly 130, while the bolt hole 127 aligns with the bolt head hole 114 of the shield assembly 130, as shown in FIG. 14. When aligned, the center of the head hole 114 and the center of the bolt hole 127 are aligned.

The tab 123 includes an aperture 124. A bolt 108 of a hidden shackle padlock 105 engages the aperture 124 of the tab 123, when the bolt 108 is in the locked position.

The central region is flanked by tabs, each having a bolt head hole ("head hole"), formed by aligned holes 121a and 126a, 121b and 126b in the panels 120, 125. The bolt hole 127 is sized and shaped to receive the shank of a bolt 160, without allowing the head 40 of the bolt to pass through. Each head hole has a larger diameter than the bolt hole 127, because each head hole surrounds the head 35, 45 of a bolt 155, 165.

The thickness of the hasp assembly 135 equals the combined thicknesses of the plates 120, 125, which is at least equal to the thickness of the bolt heads 35, 45. Thus, each bolt head 35, 45 may be contained in a head hole without protruding from the head hole. Bolt head 40, however, which abuts the back panel 125 of the hasp assembly 135, partially extends into the bolt head hole 114 of the shield assembly 130.

Figure 12:
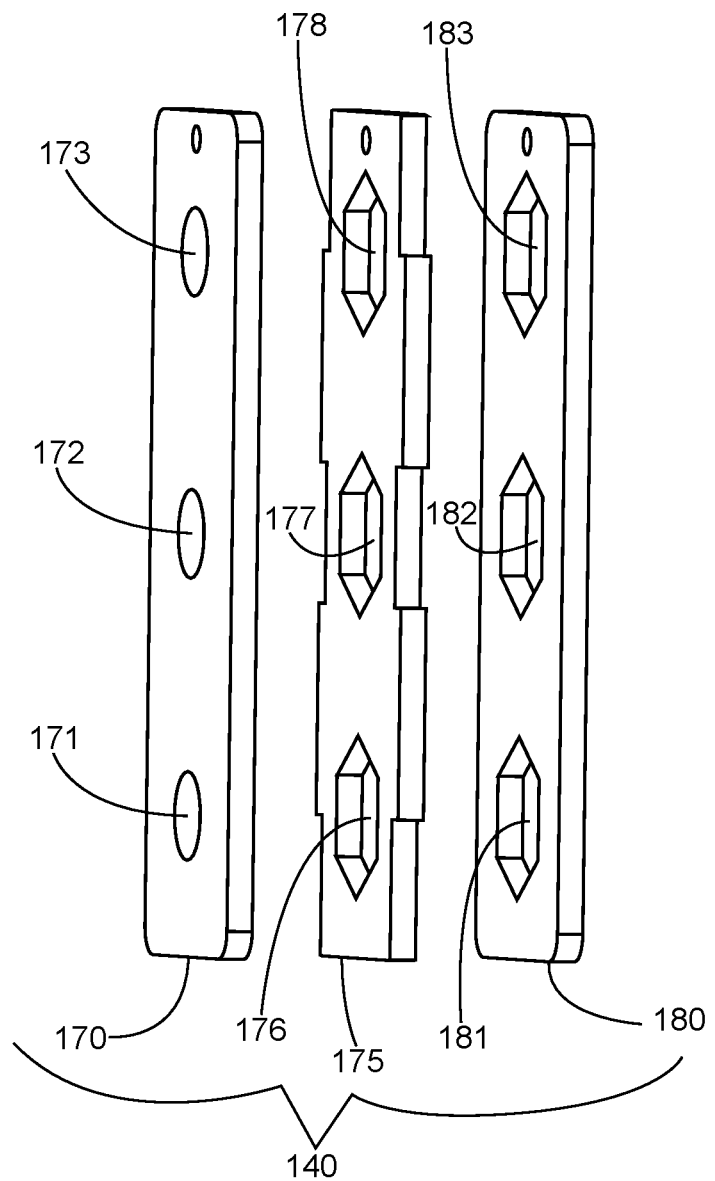
FIG. 12 is an exploded perspective view of an exemplary nut shield assembly for an anti-tampering device according to principles of the invention.
Figure 13:
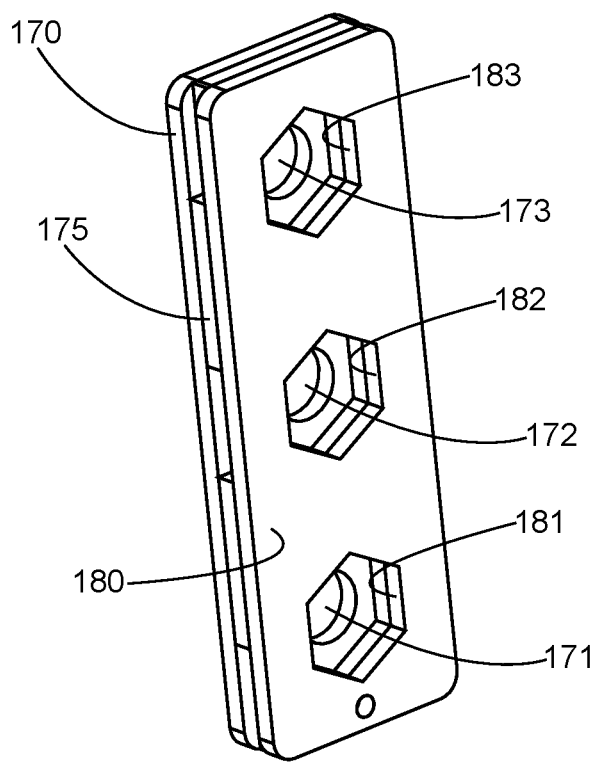
FIG. 13 is a perspective view of an exemplary nut shield assembly for an anti-tampering device according to principles of the invention.

The nut assembly 140, is shown in FIGS. 4, 12, 13. The functions of the nut assembly 140 are to provide a structure to secure between the nuts 185, 190, 195 and the web 31 of the channel 30, and to provide, in the structure, a plurality of hexagonal channels that prevent rotation of the nuts 185, 190, 195, which are received in hexagonal channels of the structure. While the exemplary nut assembly is depicted as an assembly of three distinct panels 170, 175, 180, the invention is not limited to such a laminated structure. Integrally formed structures, such as machined and cast structures, come within the scope of the invention.

The exemplary illustrated nut assembly 140 includes a base 170 that contains a plurality of (e.g., 3) evenly spaced bolt holes 171-173. Intermediate and outermost strata (e.g., panels 175, 180) contain a hexagonal aperture 176-178, 181-183 aligned with each bolt hole 171-173. Pairs of aligned hexagonal apertures form a hexagonal channel, for example, apertures 176 and 181 form a hexagonal channel. Likewise, apertures 177 and 182 form a hexagonal channel. Apertures 178 and 183 also form a hexagonal channel. Each hexagonal channel is sized and shaped to receive a hexagonal nut 185, 190, 195, but prevent rotation of the nut 185, 190, 195 in the hexagonal channel. Bolts 155, 160, 165 extend through bolt holes in the web 31 of the channel 30, through bolt holes 171-173 in the base 170 of the nut assembly 140, and into the hexagonal apertures 176-178, 181-183 aligned with each bolt hole 171-173. The threaded shank of the bolts 155, 160, 165 extend into the hexagonal channels and thread into the nuts 185, 190, 195, which are contained in the hexagonal channels during assembly. The thickness of the intermediate and outermost panels 175, 180 is sufficient for the hexagonal channels to contain the entirety or majority of each nut 185, 190, 195.

As shown in FIGS. 3, 5, 15, 16, the lock assembly 105 is a hidden shackle padlock. The lock assembly 105 is a puck-shaped locking assembly that is slidably received in the notched tubular flange 110. The notched tubular flange 110 has an inner diameter that is slightly larger than the outer diameter of the hidden shackle padlock 105.

Figure 15:
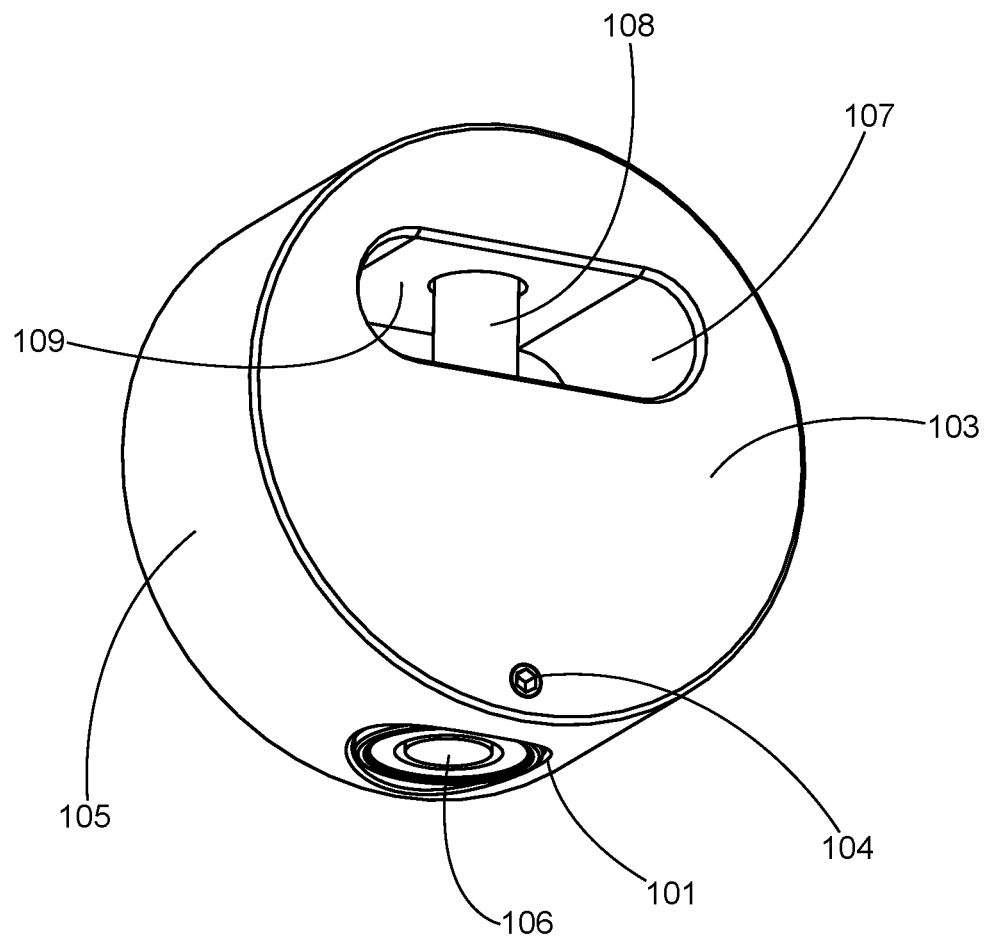
FIG. 15 is a perspective view of an exemplary hidden shackle padlock for an anti-tampering device according to principles of the invention, with the hidden shackle padlock in the locked position.
Figure 16:
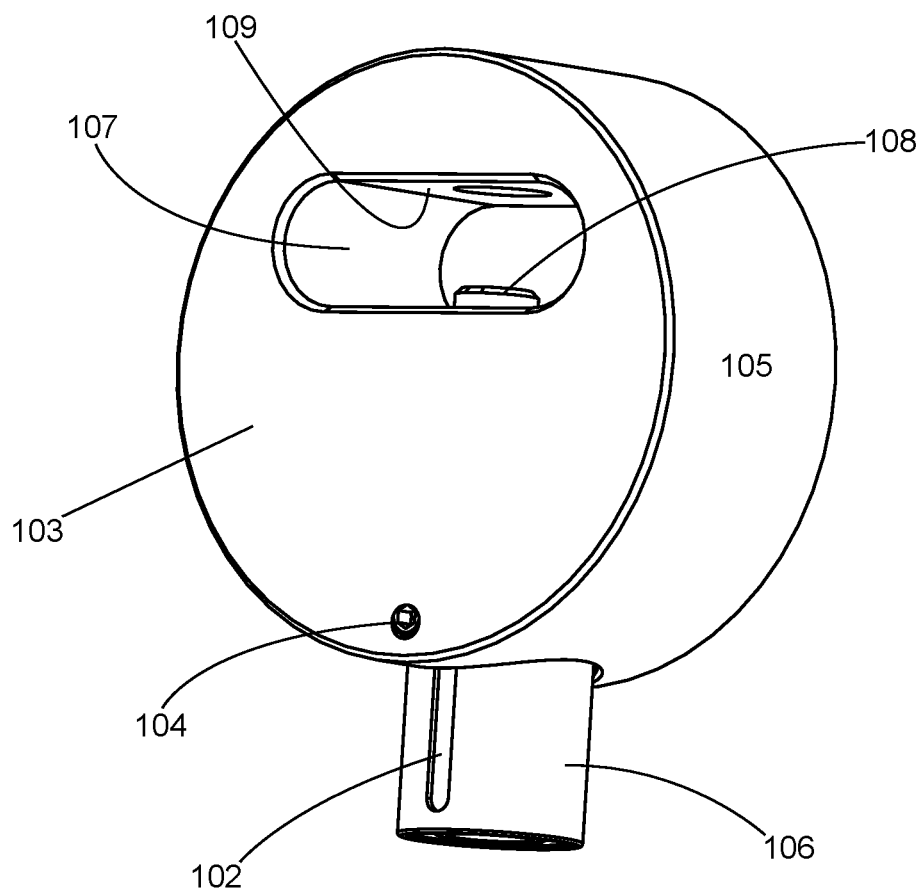
FIG. 16 is a perspective view of an exemplary hidden shackle padlock for an anti-tampering device according to principles of the invention, with the hidden shackle padlock in the unlocked position.

The notched tubular flange 110 also has a notch 113. A keyed lock cylinder 106 is about flush with the periphery of the hidden shackle padlock 105 when the keyed lock cylinder is in a locked position, as shown in FIGS. 5 and 15. The keyed lock cylinder 106 extends radially outward from the periphery of the hidden shackle padlock 105 when the keyed lock cylinder is in an unlocked position, as shown in FIG. 16. The notch 113 allows access to the keyed lock cylinder 106 with a key for locking and unlocking. The notch 113 also allows the keyed lock cylinder 106 to extend radially outward from the periphery of the hidden shackle padlock 105 when the keyed lock cylinder 106 is in a unlocked position. The notched tubular flange 110 does not prevent extension of the keyed lock cylinder 106, because the notch 113 provides space for the extension.

The hidden shackle padlock 105 has a rear surface 103. A compartment 107 extends through the rear surface 103 into the hidden shackle padlock 105. The compartment 107 does not extend entirely through the hidden shackle padlock 105. A locking surface 109 is provided in the compartment 107. A locking bolt 108 is movable between a retracted unlocked position as shown in FIG. 16 and an extended locked position as shown in FIG. 15. In the extended locked position, a portion of the bolt 108 extends into a mating hole in the locking surface. The bolt 108 is generally cylindrical and has a diameter that is less than the diameter of the aperture 124 in the tab 123. The compartment 107 receives the tab 123, when the hidden shackle padlock 105 is inserted notched tubular flange 110 and the anti-tampering device 100 is configured for use. The aperture 124 of the tab 123 is aligned with the bolt 108 when the hidden shackle padlock 105 is inserted notched tubular flange 110 and the anti-tampering device 100 is configured for use. When the bolt 108 is moved into the locked position, the bolt 108 extends through the aperture 124 in the tab 123 and into the locking surface 109. In such a locked position, the bolt 108 prevents removal of the tab 123 from the compartment 107 and the hidden shackle padlock 105 is locked to the tab 123 in the notched tubular flange 110.

The bolt 108 is coupled to the keyed lock cylinder 106. Linear movement of the keyed lock cylinder 106 causes linear movement of the bolt 108. Movement of the keyed lock cylinder 106 to a locked position causes movement of the bolt 108 to the locked position. When the keyed lock cylinder 106 is in a locked position, the bolt 108 is in the locked position. Movement of the keyed lock cylinder 106 to an unlocked position causes movement of the bolt 108 to the unlocked position. When the keyed lock cylinder 106 is in an unlocked position, the bolt 108 is in the unlocked position.

The keyed lock cylinder 106 includes a guide 102 defining a range of linear motion of the lock. The range of linear motion is between a locked position and an unlocked position. In the illustrated embodiment, the guide 102 is an elongated keyseat (e.g., an elongated recess or slot). A key 104 may extend from the housing of the hidden shackle padlock 105 into the elongated keyseat comprising the guide 102. In the exemplary embodiment, the key 104 is a set screw. The set screw has a shank threaded into a threaded channel 115 of the housing 105. The housing of the hidden shackle padlock 105 includes a threaded channel in which the shank of the set screw is threadedly received. The threaded channel extends from the back side 103 of the housing of the hidden shackle padlock 105 to the keyseat guide 102. A tip of the set screw extends from the shank into the keyseat guide 102, limiting linear movement of the keyed lock cylinder 106, but not preventing linear motion within the range of motion defined by the keyseat guide 102.

Figure 17:
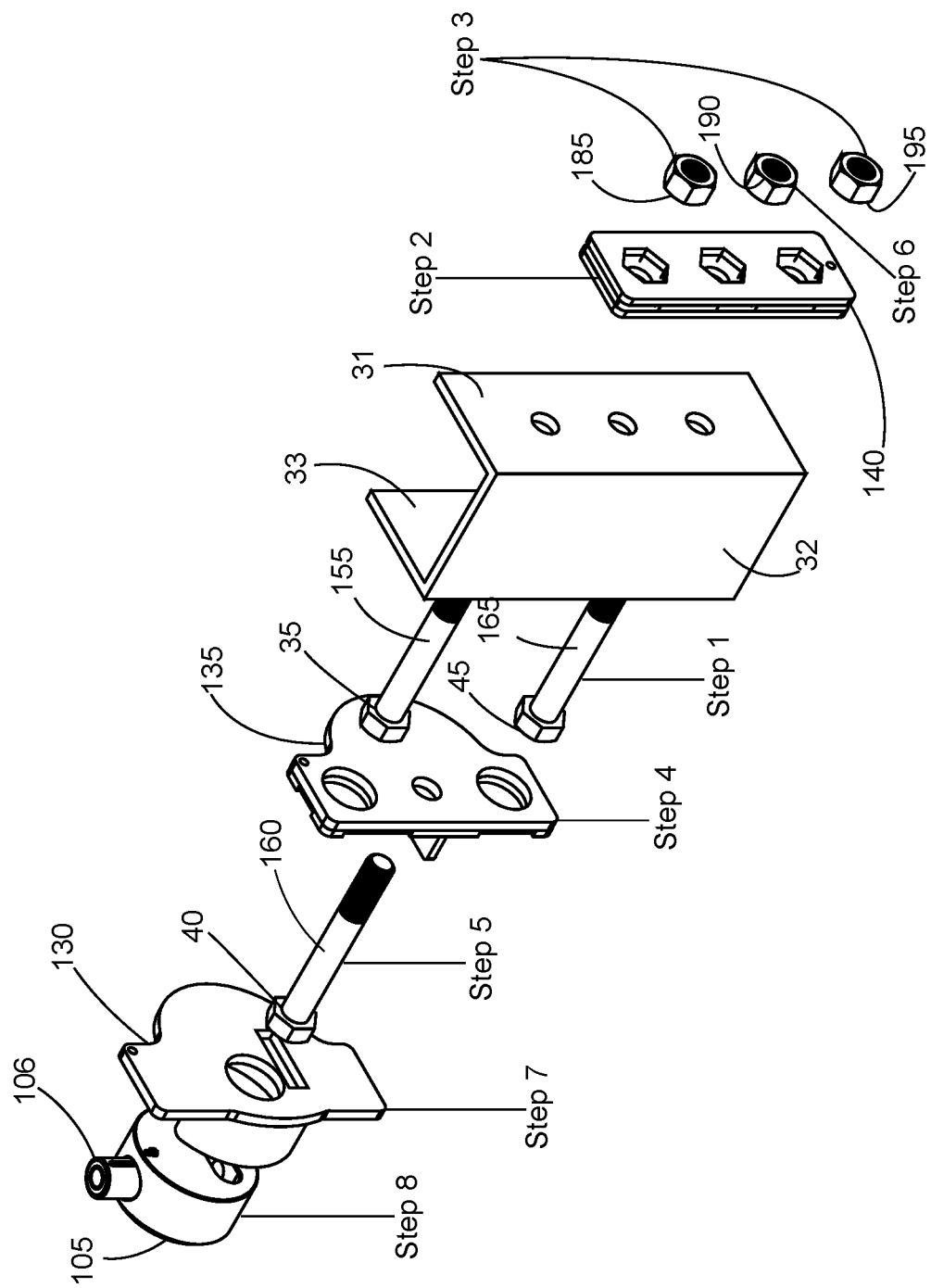
FIG. 17 is a schematic illustrating steps of an exemplary method of using an anti-tampering device according to principles of the invention.
Figure 18:
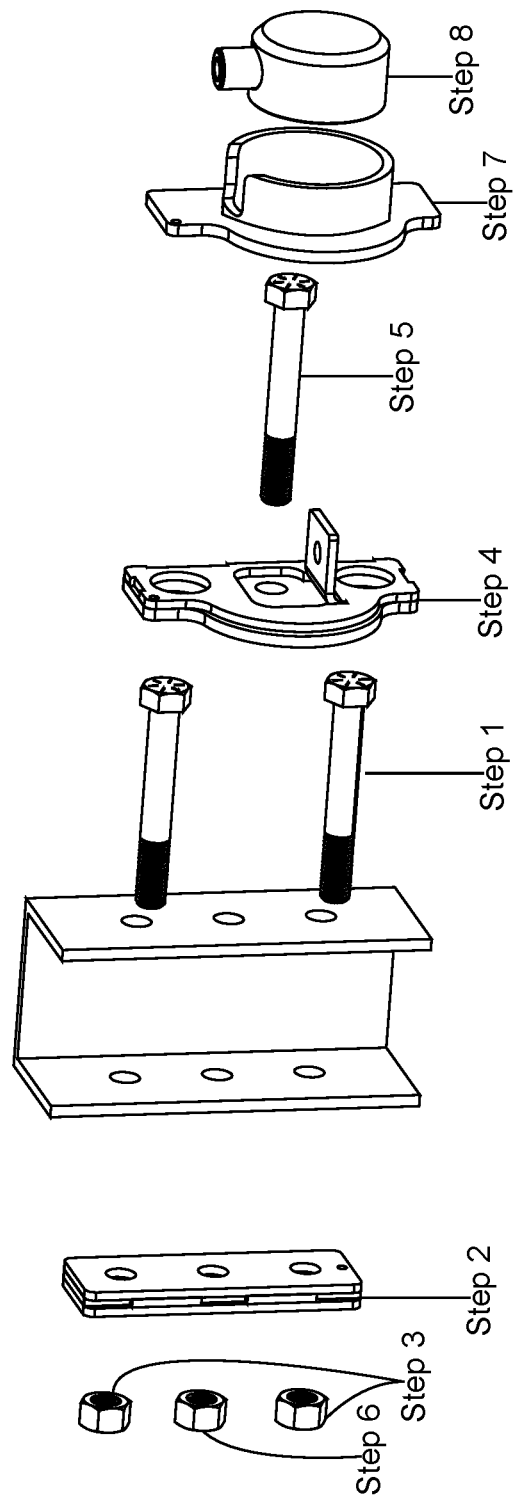
FIG. 18 is another schematic illustrating steps of the exemplary method of using an anti-tampering device according to principles of the invention.

With reference to FIGS. 17 and 18, schematics illustrating steps of an exemplary method of using an anti-tampering device 100 according to principles of the invention are provided. The sequence of steps may be varied somewhat without departing from the scope of the invention. In Step 1, fewer than all bolts 155, 165 (e.g., two of three bolts) are inserted through holes in the flanges 31, 33 of the channel 30. In the exemplary method, the center bolt 160 is not inserted at this step. The bolts 155, 165 are partially inserted, until the free end of the shank of each bolt reaches the outer edge of the hole in the flange 31 on the side of the channel that is opposite the flange 33 adjacent to the heads of the bolts.

In Step 2, the nut shield 140 is aligned with the bolt holes and the free ends of the shanks of the bolts 155, 165. The aligned nut shield 140 provides compartments (i.e., hexagonal channels) in which the nuts 185, 195 may be placed while the bolts 155, 165 are threaded to the nuts 185, 195 in a subsequent step.

In Step 3, the nuts 185, 195 are inserted into the hexagonal channels in the nut shield 140 and the bolts 155, 165 are threaded into the nuts 185, 195. The hexagonal channels prevent rotation of the nuts 185, 195 while the bolt heads 35, 45 are rotated for threaded engagement. Upon completing this step, the nut shield 140 is secured to a flange 31 of the channel by two bolts 155, 165 and nuts 185, 195, leaving a hexagonal channel unoccupied by a nut 190.

In Step 4, the hasp assembly 135 is positioned against the flange 31, with the heads 35, 45 of bolts received in the head holes of the hasp assembly 135. The bolt hole of the hasp assembly 135 is aligned with the unoccupied bolt holes aligned in the flanges of the channel and also aligned with the unoccupied hexagonal channel of the nut shield.

In Step 5, the shank of the remaining bolt 160 is inserted through the bolt hole of the hasp assembly 135 and through the middle bolt holes aligned in the flanges of the channel. Upon completing this step, the remaining bolt 160 is ready for threaded engagement of a nut 190 in the remaining hexagonal channel of the nut shield 140.

In Step 6, the remaining nut 190 is inserted into the central hexagonal channel and the bolt 160 is threaded into the nut 190, until tight. The hexagonal channel prevents rotation of the nut 190 while the bolt head 40 is rotated for threaded engagement. Upon completing this step, the hasp assembly 135 is secured to a flange 33 of the channel 30 by one bolt 160 and nut 190. Additionally, the heads 35, 45 of bolts 155, 165 received in the head holes of the hasp assembly 135 prevent rotation of the hasp assembly 135 relative to the channel 30.

In Step 7, the hasp shield 130 is slid onto the hasp assembly, with the tab of the hasp assembly 135 extending through the slot of the hasp shield 130, and the central head hole of the hasp shield 130 aligned with the head 40 of the bolt 160 that secures the hasp assembly 135 to the channel 30. Upon completing this step, the bolt heads 35, 45 received in the head holes of the hasp assembly are covered by the hasp shield 130 and the hasp shield 1330 is positioned for locking, but is not yet locked in place.

In Step 8, the hidden shackle padlock 105 is slid into the notched annular flange of the hasp shield 130, with the keyed lock cylinder 106 extending through the notch in the flange. The tab is receive in the compartment in the back side of the hidden shackle padlock 105. Then, also in Step 8, the keyed lock cylinder 106 is moved to the locked position, causing the bolt of the hidden shackle padlock 105 to extend through the aperture in the tab of the hasp assembly 135. Upon completing this step, the hidden shackle padlock 105 cannot be removed from the notched annular flange, the hidden shackle padlock covers the head 40 of the bolt 160 within the notched annular flange, and the hasp shield 130 covers the bolt heads 35, 45 received in the head holes of the hasp assembly 135, and the hasp shield 130 is locked to the hasp assembly 135 which is bolted to the channel 30, and the nut shield 140 contains the nuts 185, 190, 195 in the hexagonal channels thereby shielding the nuts 185, 190, 195 from access with ordinary tools for removal such as sockets and wrenches.

To remove the anti-tampering device 100, the steps are performed in reverse, staring with removal of the hidden shackle padlock 105 by unlocking the keyed cylinder 106, and removing the hidden shackle padlock 105 from the notched annular flange of the hasp shield 130. Then the hasp shield may be removed. Then the bolt 160 securing the hasp assembly 135 to the flange 33 may be removed. Then the hasp assembly may be removed. Then the bolts 155, 165 securing the nut shield 140 to the flange 31 may be removed. Then the nuts 185, 190, 195 and nut shield may be removed.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An anti-tampering device for a bolted assembly, the anti-tampering device comprising:
   a nut shield including a body having a plurality of bolt holes and plurality of hexagonal channels, each bolt hole of the nut shield being aligned with a hexagonal channel of the nut shield, each hexagonal channel being configured to contain and prevent rotation of a nut, and each bolt hole being configured to receive a threaded end of a bolt and to prevent passage of the nut from the hexagonal channel into the bolt hole;
   a hasp assembly including a hasp body with a plurality of head holes and a bolt hole, and a locking tab extending orthogonally from the hasp body, and the plurality of head holes and the bolt hole in the hasp body being configured for alignment with the bolt holes and hexagonal channels of the nut shield, and each head hole of the plurality of head holes being sized to contain a head of a bolt; and
   a hasp shield including a hasp shield body configured to overlay the hasp body, and the hasp shield body including a slot for receiving the locking tab of the hasp assembly and a head hole in alignment with the bolt hole of the hasp assembly when the locking tab is received through the slot in the hasp shield body, and an annular flange surrounding the slot and head hole in the hasp shield body and a defining a volume in which a lock may be received.

2. The anti-tampering device of claim 1, the annular flange comprising an elongated plate bent into a ring form.

3. The anti-tampering device of claim 1, the lock comprising a hidden shackle padlock, and the annular flange having an inner diameter, and the hidden shackle padlock having an outer diameter, and the inner diameter of the annular flange not being less than the outer diameter of the hidden shackle padlock, and the volume defined by the annular flange being sufficient to substantially contain the hidden shackle padlock.

4. The anti-tampering device of claim 3, and the annular flange including a notch, and the hidden shackle padlock including a moveable locking element, and the notch defining a space configured to receive the moveable locking element.

5. The anti-tampering device of claim 4, the hidden shackle padlock including a rear compartment, and the tab of the hasp assembly extending into the rear compartment, and the hidden shackle padlock including a locking bolt, and the locking bolt being moveable between a locked position and an unlocked position, and in the locked position the bolt engaging the tab in the rear compartment, and in the unlocked position, the bolt being apart from the tab in the rear compartment.

6. The anti-tampering device of claim 5, the tab including an aperture, and in the locked position the bolt extending through the aperture of the tab.

7. The anti-tampering device of claim 1, the nut shield including an inner nut shield plate, a middle nut shield plate and an outer nut shield plate, and the inner nut shield plate including the plurality of bolt holes, and the middle nut shield plate including a plurality of hexagonal holes configured for alignment with the plurality of bolt holes when the middle nut shield plate overlays the inner nut shield plate, and the outer nut shield plate including the plurality of hexagonal holes, and the plurality of hexagonal holes of the outer nut shield plate configured for alignment with the plurality of hexagonal holes of the middle nut shield plate when the outer nut shield plate overlays the middle nut shield plate, and the plurality of hexagonal channels being comprised of the plurality of hexagonal holes of the outer nut shield plate aligned with the plurality of hexagonal holes of the middle nut shield plate when the outer nut shield plate overlays the middle nut shield plate, and the middle nut shield plate overlaying and being attached to the inner nut shield plate, and the outer nut shield plate overlaying and being attached to the middle nut shield plate.

8. The anti-tampering device of claim 1, the hasp body including an inner hasp body plate overlaying an outer hasp body plate, the inner hasp body plate including the bolt hole, and the outer hasp body plate including a partial cutout bent to form the tab, and the plurality of head holes being formed in the inner hasp body plate and overlaid outer hasp body plate, and the outer hasp body plate being attached to the inner hasp body plate.

9. A bolted assembly with an anti-tampering device, the bolted assembly comprising a first component and a second component, the first component including a plurality of mounting holes, the second component including a plurality of mounting holes alignable with the plurality of mounting holes of the first component; and
a plurality of bolts and a plurality of nuts, each bolt of the plurality of bolts having a head and a shank with a threaded end;
the anti-tampering device comprising:
a nut shield including a body having a plurality of bolt holes and plurality of hexagonal channels, each bolt hole of the nut shield being aligned with a hexagonal channel of the nut shield, each hexagonal channel being configured to contain and prevent rotation of a nut of the plurality of nuts, and each bolt hole being configured to receive a threaded end of a bolt of the plurality of bolts and to prevent passage of the nut from the hexagonal channel into the bolt hole;
a hasp assembly including a hasp body with at least one head hole and a bolt hole, and a locking tab extending orthogonally from the hasp body, and the at least one head hole and the bolt hole in the hasp body being configured for alignment with the bolt holes and hexagonal channels of the nut shield, and each head hole of the at least one head hole being sized to contain a head of a bolt of the plurality of bolts;
a hasp shield including a hasp shield body configured to overlay the hasp body, and the hasp shield body including a slot for receiving the locking tab of the hasp assembly and a head hole in alignment with the bolt hole of the hasp assembly when the locking tab is received through the slot in the hasp shield body, and an annular flange surrounding the slot and head hole in the hasp shield body and a defining a volume in which a lock may be received; and
a first bolt of the plurality of bolts having a shank extending through a first mounting hole of the plurality of mounting holes in the first component, and through a first mounting hole of the plurality of mounting holes in the second component, and into the nut shield, and a first nut of the plurality of nuts engaging the threaded end of the first bolt, and the first nut being contained in a first hexagonal channel of the plurality of hexagonal channels of the nut shield; and
a second bolt of the plurality of bolts having a shank extending through the bolt hole of the hasp assembly, a second mounting hole of the plurality of mounting holes in the first component, a second mounting hole of the plurality of mounting holes in the second component, and into the nut shield, and a second nut of the plurality of nuts engaging the threaded end of the second bolt, and the second nut being contained in a second hexagonal channel of the plurality of hexagonal channels of the nut shield.

10. The bolted assembly with the anti-tampering device of claim 9, further comprising
a third bolt of the plurality of bolts having a shank extending through a third mounting hole of the plurality of mounting holes in the first component, a third mounting hole of the plurality of mounting holes in the second component, and into the nut shield, and a third nut of the plurality of nuts engaging the threaded end of the third bolt, and the third nut being contained in a third hexagonal channel of the plurality of hexagonal channels of the nut shield.

11. The bolted assembly with the anti-tampering device of claim 9, the lock comprising a hidden shackle padlock, and the annular flange having an inner diameter, and the hidden shackle padlock having an outer diameter, and the inner diameter of the annular flange not being less than the outer diameter of the hidden shackle padlock, and the volume defined by the annular flange being sufficient to substantially contain the hidden shackle padlock.

12. The bolted assembly with the anti-tampering device of claim 10, and the annular flange including a notch, and the hidden shackle padlock including a moveable locking element, and the notch defining a space configured to receive the moveable locking element.

13. The bolted assembly with the anti-tampering device of claim 12, the hidden shackle padlock including a rear compartment, and the tab of the hasp assembly extending into the rear compartment, and the hidden shackle padlock including a locking bolt, and the locking bolt being moveable between a locked position and an unlocked position, and in the locked position the bolt engaging the tab in the rear compartment, and in the unlocked position, the bolt being apart from the tab in the rear compartment.

14. The bolted assembly with the anti-tampering device of claim 13, the tab including an aperture, and in the locked position the bolt extending through the aperture of the tab.

15. The bolted assembly with the anti-tampering device of claim 9, the nut shield including an inner nut shield plate, a middle nut shield plate and an outer nut shield plate, and the inner nut shield plate including the plurality of bolt holes, and the middle nut shield plate including a plurality of hexagonal holes configured for alignment with the plurality of bolt holes when the middle nut shield plate overlays the inner nut shield plate, and the outer nut shield plate including the plurality of hexagonal holes, and the plurality of hexagonal holes of the outer nut shield plate configured for alignment with the plurality of hexagonal holes of the middle nut shield plate when the outer nut shield plate overlays the middle nut shield plate, and the plurality of hexagonal channels being comprised of the plurality of hexagonal holes of the outer nut shield plate aligned with the plurality of hexagonal holes of the middle nut shield plate when the outer nut shield plate overlays the middle nut shield plate, and the middle nut shield plate overlaying and being attached to the inner nut shield plate, and the outer nut shield plate overlaying and being attached to the middle nut shield plate.

16. The bolted assembly with the anti-tampering device of claim 9, the hasp body including an inner hasp body plate overlaying an outer hasp body plate, the inner hasp body plate including the bolt hole, and the outer hasp body plate including a partial cutout bent to form the tab, and the at least one head hole being formed in the inner hasp body plate and overlaid outer hasp body plate, and the outer hasp body plate being attached to the inner hasp body plate.

17. The bolted assembly with the anti-tampering device of claim 9, the head of the first bolt being contained in a first head hole of the at least one head hole of the hasp assembly.

18. The bolted assembly with the anti-tampering device of claim 17, the head of the first bolt contained in the first head hole of the at least one head hole of the hasp assembly being overlaid by the hasp shield.

19. The bolted assembly with the anti-tampering device of claim 9, the head of the second bolt being overlaid by a hidden shackle padlock in the volume defined by the annular flange.

20. The bolted assembly with the anti-tampering device of claim 9, the first component being an adjustable trailer coupler, and the second component being a channel mount for the adjustable trailer coupler.

\* \* \* \* \*